(12) United States Patent
Sato

(10) Patent No.: US 8,939,660 B2
(45) Date of Patent: Jan. 27, 2015

(54) OPTICAL FIBER FUSION SPLICER

(75) Inventor: Ryuichiro Sato, Yokohama (JP)

(73) Assignee: SEI Optifrontier Co., Ltd., Yokohama (JP)

( * ) Notice: Subject to any disclaimer, the term of this patent is extended or adjusted under 35 U.S.C. 154(b) by 6 days.

(21) Appl. No.: 13/884,841

(22) PCT Filed: Dec. 8, 2011

(86) PCT No.: PCT/JP2011/078365
§ 371 (c)(1),
(2), (4) Date: May 10, 2013

(87) PCT Pub. No.: WO2012/086418
PCT Pub. Date: Jun. 28, 2012

(65) Prior Publication Data
US 2013/0236145 A1 Sep. 12, 2013

(30) Foreign Application Priority Data
Dec. 24, 2010 (JP) .................................. 2010-288584

(51) Int. Cl.
*G02B 6/255* (2006.01)
(52) U.S. Cl.
CPC ............ *G02B 6/2553* (2013.01); *G02B 6/2555* (2013.01)
USPC ............................................ 385/96; 385/137
(58) Field of Classification Search
CPC ............................. G02B 6/2553; G02B 6/2555
USPC ............................................. 385/95–99, 137
See application file for complete search history.

(56) References Cited

U.S. PATENT DOCUMENTS

| | | | | |
|---|---|---|---|---|
| 4,276,113 A | * | 6/1981 | Carlsen et al. | 156/502 |
| 4,784,456 A | * | 11/1988 | Smith | 385/55 |
| 5,395,101 A | * | 3/1995 | Takimoto et al. | 269/289 R |
| 6,467,973 B2 | * | 10/2002 | Takahashi et al. | 385/96 |
| 6,608,958 B2 | * | 8/2003 | Anderson | 385/136 |

FOREIGN PATENT DOCUMENTS

| | | |
|---|---|---|
| JP | 58-220110 A | 12/1983 |
| JP | 64-013505 A | 1/1989 |
| JP | 03-101704 A | 4/1991 |
| JP | 2003-014974 A | 1/2003 |
| JP | 2004-184543 A | 7/2004 |
| JP | 2004-279666 A | 10/2004 |
| JP | 2008-292523 A | 12/2008 |

* cited by examiner

*Primary Examiner* — Daniel Petkovsek
(74) *Attorney, Agent, or Firm* — Global IP Counselors, LLP

(57) ABSTRACT

An optical fiber fusion splicer includes positioning members and clamping members. Each clamping member clamps the bare fiber. A first guiding portion protrudes from the top surface of each positioning member and guides a distal end portion of the bare fiber toward the groove. A concave face of the first guiding portion has a V-shaped cross section. Each clamping member includes a second guiding portion, which guides a base portion of the bare fiber toward the groove of the corresponding positioning member, and a pressing member, which presses the bare fiber against the top surface of the fiber positioning member. A concave face of the second guiding portion has an inverted-V-shaped cross section. The fusion splicer can clamp bare fibers while the bare fibers are received by the groove.

6 Claims, 5 Drawing Sheets

OPTICAL FIBER FUSION SPLICER

CROSS-REFERENCE TO RELATED APPLICATIONS

This U.S. National stage application claims priority under 35 U.S.C. §119(a) to Japanese Patent Application No. 2010-288584, filed in Japan on Dec. 24, 2010, the entire contents of which are hereby incorporated herein by reference.

TECHNICAL FIELD

The present invention relates to optical fiber fusion splicers.

BACKGROUND ART

Japanese Unexamined Patent Application Publication No. 2008-292523 describes an optical fiber fusion splicer that includes a pair of grasping structures, which each grasp an optical fiber, and a pair of arc electrodes, which are disposed between the grasping structures. Each grasping structure of the optical fiber fusion splicer includes a V-shaped groove base, which has a V-shaped groove that receives a bare fiber located in a distal end portion of the optical fiber, and a fiber clamp, which clamps the bare fiber received by the V-shaped groove. However, in this optical fiber fusion splicer, when the fiber clamps are to clamp bare fibers, the bare fibers are sometimes disposed obliquely with respect to the V-shaped grooves (fiber grooves) due to warping of the optical fibers and thus the bare fibers are clamped without being received by the fiber grooves.

SUMMARY OF INVENTION

Technical Problem

An object of the present invention is to provide an optical fiber fusion splicer that can clamp bare fibers located in distal end portions of optical fibers while the bare fibers are securely received by the fiber grooves.

Solution to Problem

In order to achieve the above object, the present invention provides an optical fiber fusion splicer that includes a pair of bare fiber holding members and splicing means, the pair of bare fiber holding members fixing in place bare fibers that are located in distal end portions of optical fibers and not covered by resin coatings, the splicing means fusion-splicing the bare fibers fixed in place by the bare fiber holding members together. Each of the bare fiber holding members includes a fiber positioning member and a fiber clamping member. The fiber positioning member includes a fiber groove and a first concave guiding portion on a top surface of the fiber positioning member, the fiber groove receiving a corresponding one of the bare fibers, the first concave guiding portion protruding from the top surface of the fiber positioning member and guiding the bare fiber toward the fiber groove. The fiber clamping member including a second concave guiding portion and a pressing member, the second concave guiding portion guiding toward the fiber groove a portion of the corresponding bare fiber positioned closer to a base of the bare fiber than a portion of the bare fiber guided by the first concave guiding portion, the pressing member pressing the bare fiber against the top surface of the fiber positioning member while the bare fiber is received by the fiber groove.

In the optical fiber fusion splicer according to the present invention, preferably, a concave face of the first concave guiding portion has a cross section that is V-shaped with respect to the top surface of the fiber positioning member and a concave face of the second concave guiding portion has a cross section that is inverted-V-shaped with respect to the top surface of the fiber positioning member.

Advantageous Effects of Invention

According to the present invention, bare fibers located in distal end portions of optical fibers can be clamped while being securely received by fiber grooves. Thus, when the bare fibers are fusion-spliced together, their axes can be prevented from being misaligned with each other.

DESCRIPTION OF EMBODIMENTS

Figure 1:
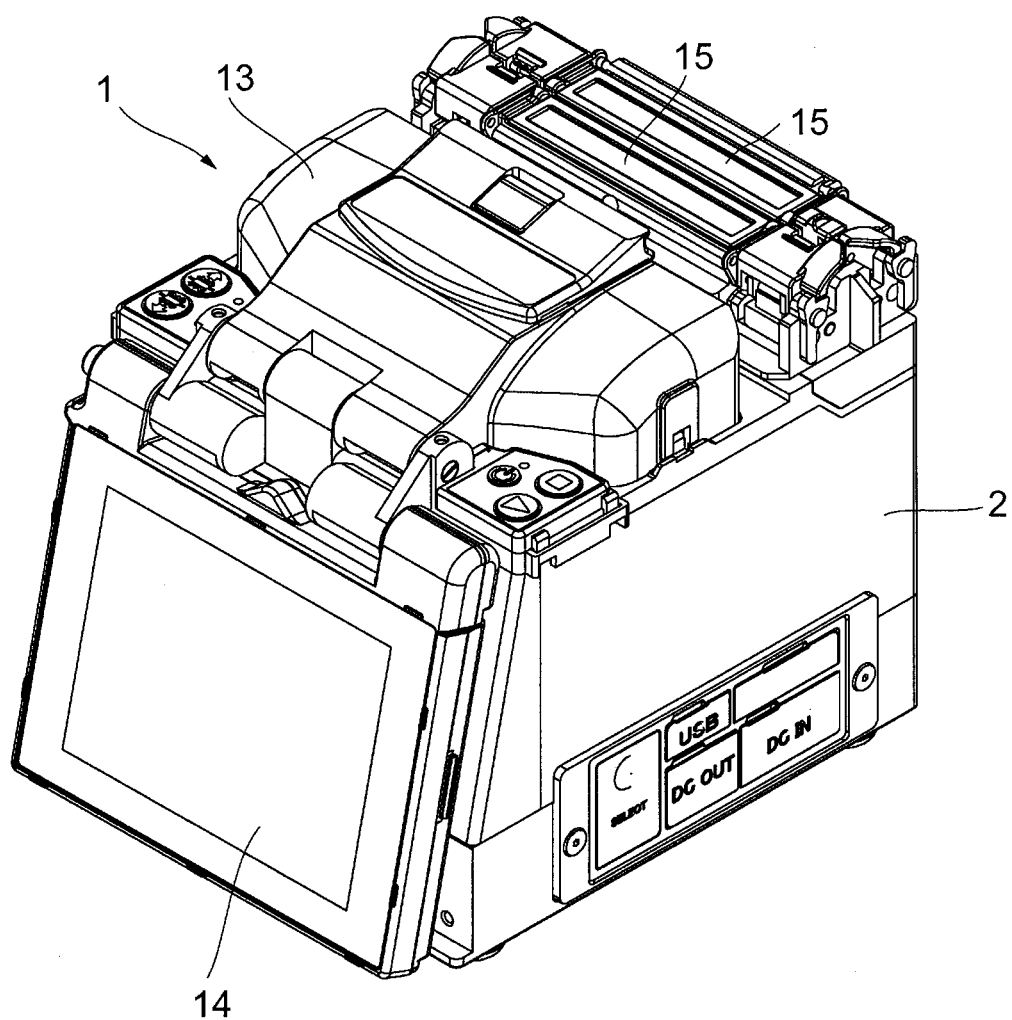
FIG. 1 is a perspective view of an optical fiber fusion splicer according to an embodiment of the present invention in a state where a wind blocking cover is closed.

Referring to the drawings, an embodiment of the present invention is described below. The drawings are provided for the illustration purpose and not for limiting the scope of the invention. The identical reference symbols denote the same parts throughout the drawings in order to avoid redundant description. Not all ratios between dimensions in the drawings are precise.

Figure 2:
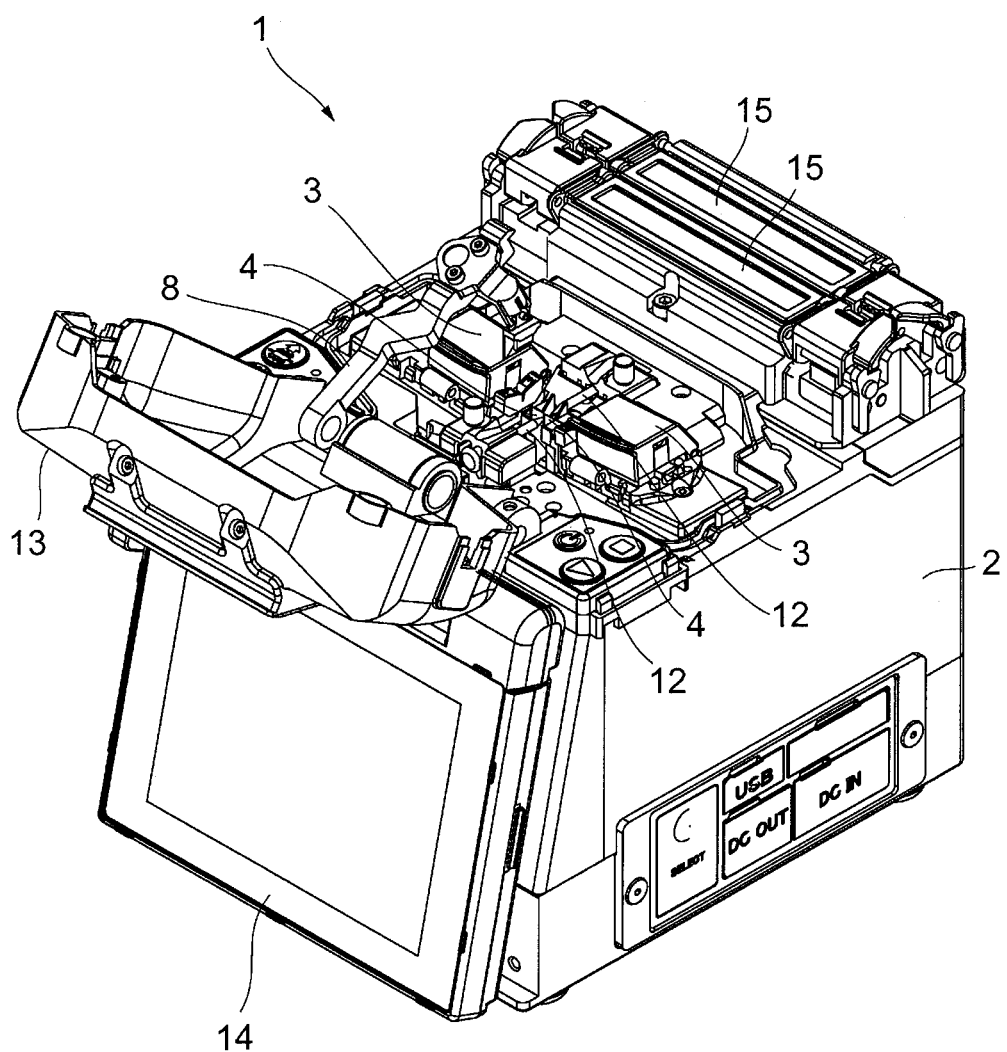
FIG. 2 is a perspective view of the optical fiber fusion splicer illustrated in FIG. 1 in a state where the wind blocking cover is open.

FIG. 1 is a perspective view of an optical fiber fusion splicer 1 according to an embodiment of the present invention in a state where a wind blocking cover 13 is closed. FIG. 2 is a perspective view of the optical fiber fusion splicer 1 in a state where the wind blocking cover 13 is open. The optical fiber fusion splicer 1 includes a box-like housing 2.

A pair of fiber holders 3 and a pair of fiber positioning members 4 are disposed on the top surface of the housing 2. Additionally, a pair of clamp arms 8 are rotatably connected to the top surface of the housing 2. A pair of arc electrodes 12 (splicing means) used to splice distal end portions of bare fibers together by an arc discharge are disposed between the fiber positioning members 4 so as to face each other. The fiber holders 3, the fiber positioning members 4, the clamp arms 8, and the arc electrodes 12 are covered by an open able and closeable wind blocking cover 13. The optical fiber fusion splicer 1 also includes a monitor 14 and two optical-fiber reinforcement heaters 15. The monitor 14 displays the state of fusion splicing imaged by a camera (not illustrated) disposed inside the housing 2. The optical-fiber reinforcement heaters 15 heat a fiber reinforcement sleeve (not illustrated) used to reinforce the fusion-spliced portion and cause the fiber reinforcement sleeve to contract.

Figure 3:
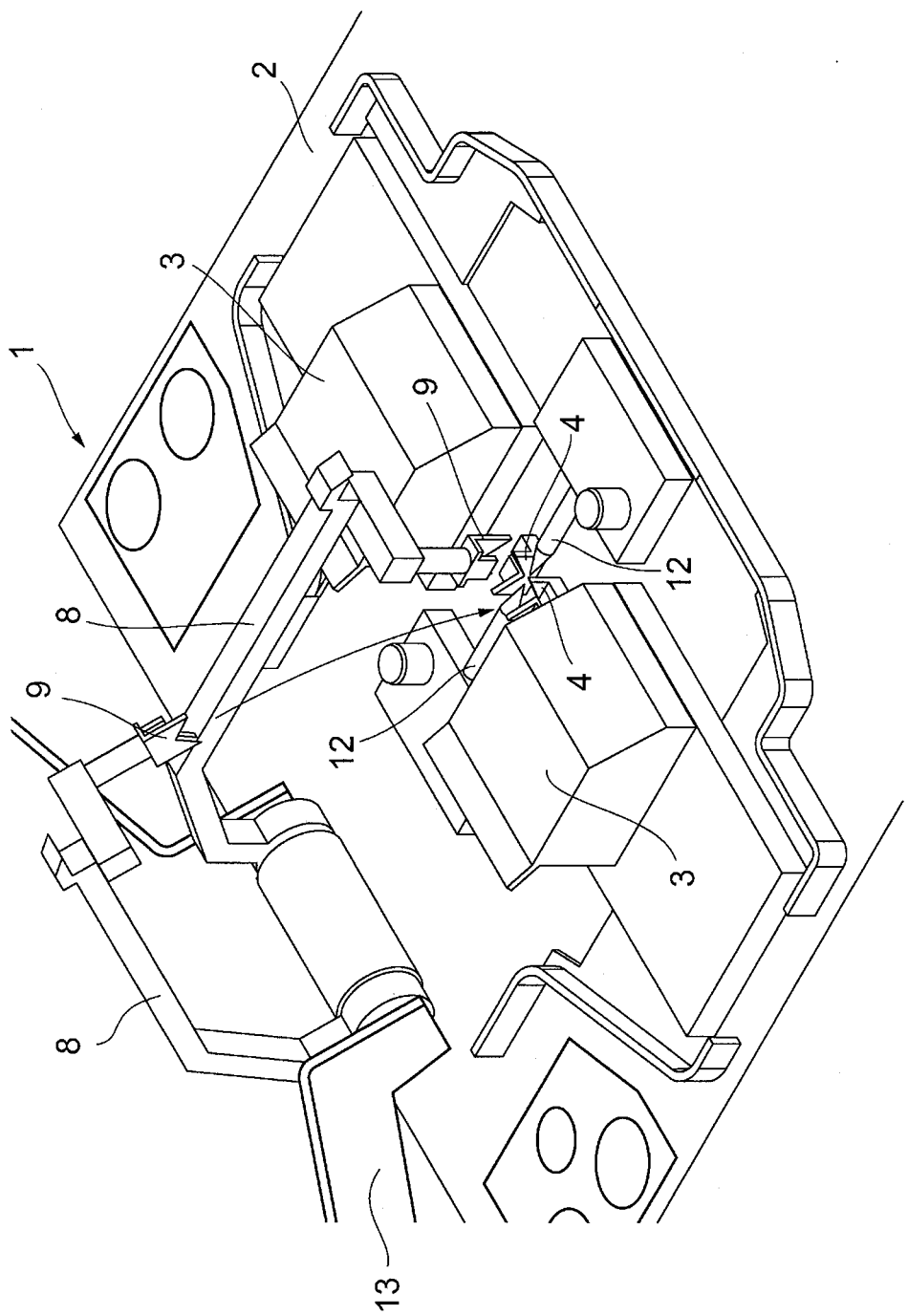
FIG. 3 is a perspective view of an area around fiber holders and fiber positioning members of the optical fiber fusion splicer illustrated in FIG. 2.

FIG. 3 is a perspective view of an area around the fiber holders 3 and the fiber positioning members 4. FIG. 4 is an enlarged perspective view of one of the fiber positioning member 4 and a fiber clamping member 9. Each fiber positioning member 4 and a corresponding one of the fiber clamping members 9 constitute a bare fiber holding member that fixes in place a bare fiber 5b located in a distal end portion of the optical fiber 5. The fiber positioning members 4 are disposed so as to face each other with the splicing means 12 interposed therebetween and allow the bare fibers 5b located in the distal end portions of the optical fibers 5 to be positioned thereon. The fiber holders 3 are disposed so as to face each other with the two fiber positioning members 4 interposed therebetween and each fiber holder 3 holds a coating 5a of the optical fiber 5 and fixes the coating 5a in place.

Figure 4A:
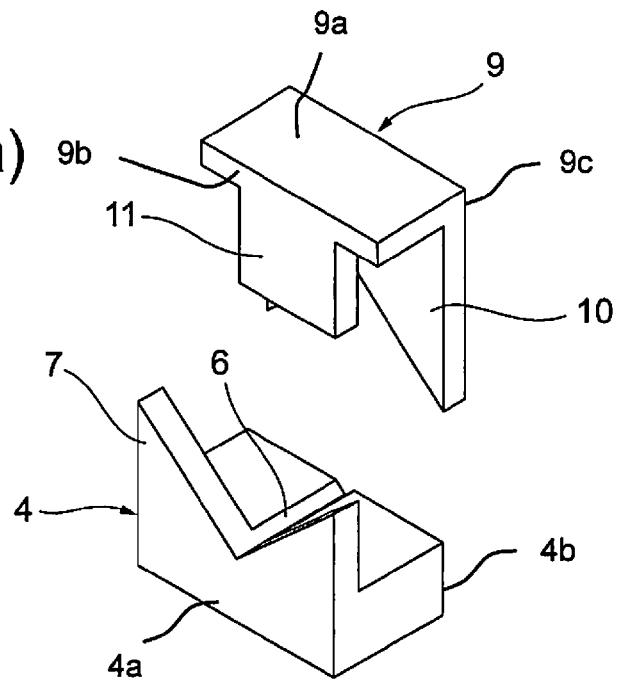
FIG. 4 is an enlarged perspective view of one of the fiber positioning members and a fiber clamping member.

Each of the fiber positioning members 4 has a first side 4a and a second side 4b opposite the first side 4a, as shown in FIG. 4(a). A fiber groove 6 having a V-shaped cross section and receiving the bare fiber 5b is formed on the top surface of each fiber positioning member 4. In addition, a concave guiding portion 7 is formed on the top surface of each fiber positioning member 4 extending upward from the first side 4a of the fiber positioning member 4. Further the concave guiding portion 7 is located on an end of the fiber positioning member 4 opposite to the end facing the corresponding fiber holder 3 so as to protrude from the top surface. The concave guiding portion 7 guides a distal end portion of the bare fiber 5b to the fiber groove 6. The concave guiding portion 7 also functions as a target used for positioning the distal end portion of the bare fiber 5b. The fiber groove 6 extends from the concave guiding portion 7 to the second side 4b of the fiber positioning member 4.

The concave guiding portion 7 protrudes from the top surface of the fiber positioning member 4 so as to have a V-shaped cross section. A bottom portion of the V-shaped portion of the concave guiding portion 7 constitutes part of the fiber groove 6. The opening angle of the V-shaped portion is approximately 90 degrees. Thus, even when a bare fiber 5b is disposed away from the fiber groove 6, the distal end portion of the bare fiber 5b can be smoothly guided toward the fiber groove 6.

Figure 4B:
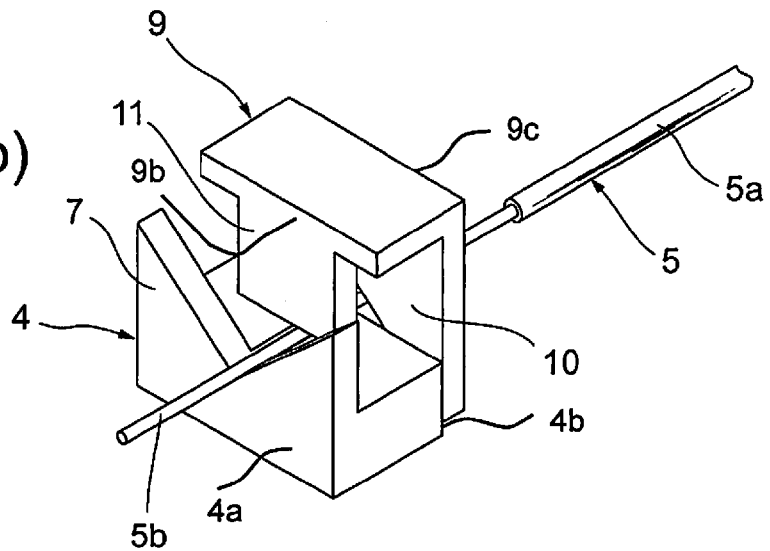

A fiber clamping member 9 that clamps the bare fiber 5b in cooperation with the corresponding fiber positioning member 4 is attached to a distal end portion of each clamp arm 8. Specifically, the fiber clamping member 9 is movable between a clamping position in which the fiber clamping member 9 overlays the fiber positioning member 4 (FIG. 4(b) and FIG. 5(e) and a non-clamping position in which the fiber clamping member 9 is spaced apart from the fiber positioning member 4 (FIG. 3 and FIG. 4(a)). The fiber clamping member 9 includes an upper section 9a having a first side 9b and a second side 9c opposite the first side 9b, a concave guiding portion 10 at the second side 9c of the upper section 9a and a pressing member 11 at the first side 9b of the upper section 9a. The concave guiding portion 10 and the pressing member 11 are spaced apart from one another, as shown in FIGS. 4(a) and 4(b). The concave guiding portion 10 guides a base portion of the bare fiber 5b to the fiber groove 6 of the fiber positioning member 4. The pressing member 11 presses the bare fiber 5b into the fiber groove 6 the top surface of the fiber positioning member 4, as illustrated in FIGS. 5(a) thru 5(e). The fiber clamping member 9 is urged toward the fiber positioning member 4 by a spring (not illustrated). In the clamping position, the fiber clamping member 9 overlays the fiber positioning member 4. Further, in the clamping position, the concave guiding portion 10 is located adjacent the second side 4b of the fiber positioning member 4 and the pressing member 11 is located adjacent the concave guiding portion 7 between the concave guiding portion 7 and the second side 4b of the fiber positioning member 4.

Figure 5:
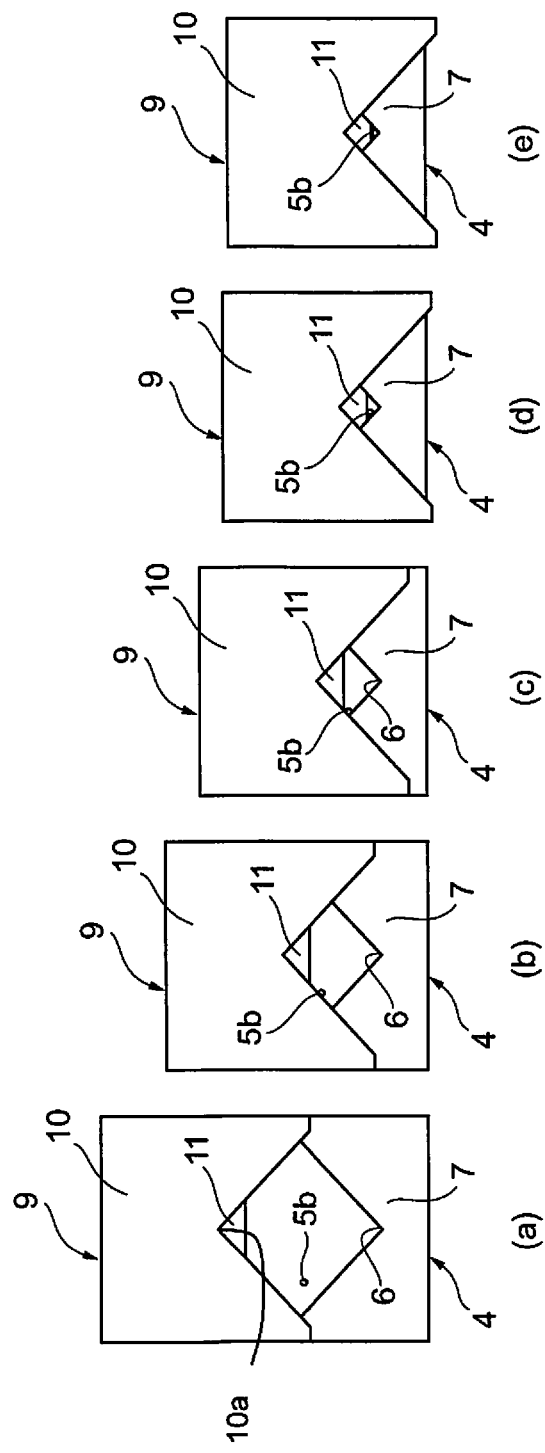
FIG. 5 is a schematic diagram illustrating how a bare fiber is brought into a fiber groove by the fiber positioning member and the fiber clamping member illustrated in FIG. 4.

The concave guiding portion 10 is configured so as to be positioned between the fiber positioning member 4 and the fiber holder 3 when the fiber clamping member 9 clamps the bare fiber 5b. The concave guiding portion 10 has a cross section that is inverted-V-shaped with respect to the top surface of the fiber positioning member 4. As shown in FIG. 5(a), the inverted V-shape of the concave guiding portion 10 has an apex 10a. The opening angle of the V-shaped portion of the concave guiding portion 10 is approximately 90 degrees as in the case of the concave guiding portion 7.

The pressing member 11 is configured so as to be positioned, when the fiber clamping member 9 clamps the bare fiber 5b in the clamping position, opposite to the fiber holder 3 with respect to the concave guiding portion 10. The pressing member 11 protrudes above the bottom of the concave surface of the concave guiding portion 10 toward the opening of the concave surface. In other words, the surface (lower end surface) of the pressing member 11 is used when the fiber clamping member 9 clamps the bare fiber 5b. Further, the lower end surface of the pressing member 11 is positioned closer to the fiber positioning member 4 than the apex of the V-shaped portion of the concave guiding portion 10 is. Consequently, as shown in FIGS. 5(a) thru 5(e) the lower edge or surface of the pressing member 11 extends downward below the apex of the inverted V-shaped portion of the concave guiding portion 10.

Here, the length L of the pressing member 11 by which the pressing member 11 protrudes above the bottom of the V-shaped portion of the concave guiding portion 10 is $L \geq (\sqrt{2} \times r1) - r2$ where r1 denotes the radius of the coating 5a and r2 denotes the radius of the bare fiber 5b. Therefore, even when the coating 5a of the optical fiber 5 comes into contact with the bottom of the V-shaped portion of the concave guiding portion 10, the bare fiber 5b received by the fiber groove 6 can be securely pressed by the pressing member 11.

The wind blocking cover 13 is rotatable via a shaft that is shared by the clamp arms 8. The clamp arms 8 are attachable to and detachable from the wind blocking cover 13.

In the case where the optical fiber fusion splicer 1 thus configured fusion-splices two optical fibers 5 together, while the wind blocking cover 13 is open as illustrated in FIG. 2, first, the fiber holders 3 hold the coatings 5a of the optical fibers 5 and fix the coatings 5a in place. The fiber positioning members 4 concurrently allow the bare fibers 5b located in the distal end portions of the optical fibers 5 to be positioned. Then, the fiber clamping members 9 attached to the distal end portions of the clamp arms 8 are lowered by rotating the clamp arms 8 toward the fiber positioning members 4, so that the fiber clamping members 9 clamp the bare fibers 5b.

Here, when each bare fiber 5b is to be positioned on the corresponding fiber positioning member 4, the bare fiber 5b is not received by the fiber groove 6 in some cases, as illustrated in FIG. 5(a), as a result of the bare fiber 5b being disposed obliquely with respect to the fiber groove 6 due to warping of the optical fiber 5. At this time, when the fiber clamping member 9 is lowered, the concave face of the concave guiding portion 10 comes into contact with the bare fiber 5b, as illustrated in FIG. 5(b), and the bare fiber 5b is guided along the concave face having an inverted-V-shaped cross section toward the fiber groove 6, as illustrated in FIG. 5(c). Since the concave guiding portion 10 guides the base portion of the bare fiber 5b toward the fiber groove 6 at this time, the bare fiber 5b is securely brought closer to the fiber groove 6.

When the fiber clamping member 9 is lowered further and the pressing member 11 presses the distal end portion of the bare fiber 5b downward as illustrated in FIG. 5(d), the bare fiber 5b comes into contact with the concave face of the concave guiding portion 7. Thus, the bare fiber 5b is now guided along the concave face having a V-shaped cross section toward the fiber groove 6. Finally, as illustrated in FIG. 5(e), the bare fiber 5b is received by the fiber groove 6.

Thereafter, while the wind blocking cover 13 is closed as illustrated in FIG. 1, the arc electrodes 12 are energized, thereby splicing the distal ends of the bare fibers 5b together. Thus, the two optical fibers 5 are fusion-spliced together.

As described above, in the embodiment, the fiber positioning member 4 includes the concave guiding portion 7, which guides the distal end portion of the bare fiber 5b toward the fiber groove 6. In addition, the fiber clamping member 9 includes the concave guiding portion 10, which guides the base portion of the bare fiber 5b toward the fiber groove 6 of the fiber positioning member 4, and the pressing member 11, which presses the bare fiber 5b against the top surface of the fiber positioning member 4. Thus, the following operational effects can be obtained.

Specifically, if the bare fiber 5b is disposed obliquely with respect to the fiber groove 6 of the fiber positioning member 4 due to warping of the optical fiber 5, the base portion of the bare fiber 5b is guided along the concave face of the concave guiding portion 10 toward the fiber groove 6 as the fiber clamping member 9 is lowered. Consequently, the bare fiber 5 is situated closer to the fiber groove 6. When the fiber clamping member 9 is lowered further, the bare fiber 5b is pressed downward by the pressing member 11 and the distal end portion of the bare fiber 5b is guided along the concave face of the concave guiding portion 7 toward the fiber groove 6. Finally, the bare fiber 5b is received by the fiber groove 6. In this manner, the fiber clamping member 9 can clamp the bare fiber 5b while the bare fiber 5b is securely received by the fiber groove 6. Thus, when the two optical fibers 5 are fusion-spliced together, the axes of the optical fibers 5 can be prevented from being misaligned with each other.

In addition, since the concave face of the first concave guiding portion and the concave face of the second concave guiding portion are V-shaped, the first concave guiding portion and the second concave guiding portion can be readily manufactured and the first concave guiding portion and the second concave guiding portion can smoothly guide the bare fiber toward the fiber groove.

The present invention is not limited to the above-described embodiment. For example, in the embodiment, the concave face of the concave guiding portion 7 of the fiber positioning member 4 has a V-shaped cross section and the concave face of the concave guiding portion 10 of the fiber clamping member 9 has an inverted-V-shaped cross section. However, the shapes of the concave faces of the concave guiding portions 7 and 10 are not particularly limited to those described above. For example, the concave face of the concave guiding portion 7 may have a U-shaped cross section and the concave face of the concave guiding portion 10 may have an inverted-U-shaped cross section.

CITATION LIST

Patent Literature

PTL 1: Japanese Unexamined Patent Application Publication No. 2008-292523

The invention claimed is:

1. An optical fiber fusion splicer comprising
a pair of bare fiber holding members and splicing means, the pair of bare fiber holding members fixing in place bare fibers that are located in distal end portions of optical fibers and not covered by resin coatings, the splicing means fusion-splicing the bare fibers fixed in place by the bare fiber holding members together, wherein each of the bare fiber holding members includes a fiber positioning member including a fiber groove and a first concave guiding portion on a top surface of the fiber positioning member, the fiber groove receiving a corresponding one of the bare fibers, the first concave guiding portion protruding from the top surface of the fiber positioning member and guiding the bare fiber toward the fiber groove, and a fiber clamping member including a second concave guiding portion and a pressing member, the second concave guiding portion having an inverted V-shape, the second concave guiding portion guiding toward the fiber groove a portion of the corresponding bare fiber positioned closer to a base of the bare fiber than a portion of the bare fiber guided by the first concave guiding portion, the pressing member having a lower end that protrudes downward lower than an apex of the inverted V-shape of the second concave guiding portion, the pressing member pressing the bare fiber against the top surface of the fiber positioning member while the bare fiber is received by the fiber groove.

2. The optical fiber fusion splicer according to claim 1, wherein
a concave face of the first concave guiding portion has a cross section that is V-shaped with respect to the top surface of the fiber positioning member and a concave face of the second concave guiding portion has a cross section that is inverted-V-shaped with respect to the top surface of the fiber positioning member.

3. The optical fiber fusion splicer according to claim 1, wherein
the fiber clamping member further includes an upper section having a first side and a second side opposite the first side, the second concave guiding portion being located at the second side and the pressing member extending downward from the first side of the upper section, the upper section, the second concave guiding portion and the pressing member being connected together for movement together as a single element.

4. The optical fiber fusion splicer according to claim 3, wherein
the fiber positioning member having a first side and a second side opposite the first side, the first concave guiding portion being located at the first side of the fiber positioning member and being spaced apart from the second side of the fiber positioning member, and the fiber groove extending from the first concave guiding portion to the second side of the fiber positioning member.

5. The optical fiber fusion splicer according to claim 4, wherein
the fiber clamping member is configured to move between a non-clamping position in which the fiber clamping member is spaced apart from the fiber positioning member and a fiber clamping position in which the fiber clamping member overlays the fiber positioning member in a fiber extending direction.

6. The optical fiber fusion splicer according to claim 5, wherein
with the fiber clamping member in the fiber clamping position the second concave guiding portion is located adjacent the second side of the fiber positioning member and the pressing member is located adjacent the first concave guiding portion between the first concave guiding portion and the second side of the fiber positioning member.

* * * * *